United States Patent
Fryska et al.

(10) Patent No.: US 10,746,246 B2
(45) Date of Patent: Aug. 18, 2020

(54) SEGMENTED LAYER CARBON FIBER PREFORM

(71) Applicant: Honeywell International Inc., Morris Plains, NJ (US)

(72) Inventors: Slawomir T. Fryska, Granger, IN (US); Bruce Gordy, South Bend, IN (US)

(73) Assignee: Honeywell International Inc., Morris Plains, NJ (US)

(*) Notice: Subject to any disclaimer, the term of this patent is extended or adjusted under 35 U.S.C. 154(b) by 0 days.

(21) Appl. No.: 16/114,043

(22) Filed: Aug. 27, 2018

(65) Prior Publication Data

US 2020/0061964 A1    Feb. 27, 2020

(51) Int. Cl.
| | |
|---|---|
| *F16D 69/02* | (2006.01) |
| *B32B 5/06* | (2006.01) |
| *B32B 5/26* | (2006.01) |
| *C04B 35/52* | (2006.01) |
| *C04B 35/83* | (2006.01) |

(Continued)

(52) U.S. Cl.
CPC ............. *F16D 69/023* (2013.01); *B32B 5/06* (2013.01); *B32B 5/26* (2013.01); *C04B 35/52* (2013.01); *C04B 35/83* (2013.01); *F16D 65/126* (2013.01); *B32B 2262/106* (2013.01); *B32B 2475/00* (2013.01); *C04B 2237/385* (2013.01); *F16D 2069/002* (2013.01); *F16D 2069/008* (2013.01);

(Continued)

(58) Field of Classification Search
CPC .................................................. F16D 69/023
USPC ....................................................... 428/105
See application file for complete search history.

(56) References Cited

U.S. PATENT DOCUMENTS

| | | |
|---|---|---|
| 5,388,320 A | 2/1995 | Smith et al. |
| 5,792,715 A | 8/1998 | Duval et al. |

(Continued)

FOREIGN PATENT DOCUMENTS

| | | |
|---|---|---|
| EP | 0721835 A2 | 7/1996 |
| EP | 3211262 A2 | 8/2017 |

(Continued)

OTHER PUBLICATIONS

Extended Search Report from counterpart European Application No. 19192708.6, dated Jan. 24, 2020, 5 pp.

(Continued)

*Primary Examiner* — Brent T O'Hern
(74) *Attorney, Agent, or Firm* — Shumaker & Sieffert, P.A.

(57) ABSTRACT

A preform for a carbon-carbon composite including a plurality of fibrous layers stacked and needled-punched together to form the preform in the shape of an annulus having an inner radial section and an outer radial section. Each fibrous layer includes a respective plurality of fabric segments comprising at least one of carbon fibers or carbon-precursor fibers. At least one fibrous layer includes a first fabric segment forming at least a portion the inner radial section, the first fabric segment defining a first segment bisector and a first fiber orientation angle, and a second fabric segment forming at least a portion the outer radial section, the second fabric segment defining a second segment bisector and a second fiber orientation angle, where the first and second segment bisectors are radially aligned and the first fiber orientation angle is different than the second fiber orientation angle.

20 Claims, 10 Drawing Sheets

(51) Int. Cl.
*F16D 65/12* (2006.01)
*F16D 69/00* (2006.01)
*F16D 69/04* (2006.01)

(52) U.S. Cl.
CPC .............. *F16D 2069/0491* (2013.01); *F16D 2200/0047* (2013.01); *F16D 2200/0052* (2013.01)

(56) References Cited

U.S. PATENT DOCUMENTS

| | | |
|---|---|---|
| 6,660,355 B2 | 12/2003 | Johnson |
| 6,767,602 B1 | 7/2004 | Duval et al. |
| 6,824,862 B2 | 11/2004 | Bauer et al. |
| 2004/0074075 A1 | 4/2004 | James et al. |
| 2006/0068150 A1 | 3/2006 | Henrich et al. |
| 2010/0000070 A1* | 1/2010 | La Forest ............... C04B 35/83 29/525.06 |

FOREIGN PATENT DOCUMENTS

| | | |
|---|---|---|
| EP | 3312003 A1 | 4/2018 |
| WO | 02081942 A1 | 10/2002 |
| WO | 2016023043 A1 | 2/2016 |

OTHER PUBLICATIONS

Notice of Intent to Grant and Text Intended to Grant from counterpart European Application No. 19192708.6, dated Apr. 9, 2020, 47 pp.

* cited by examiner

SEGMENTED LAYER CARBON FIBER PREFORM

TECHNICAL FIELD

The disclosure relates to the manufacture of carbon-carbon composite materials, such as the manufacture of aircraft brake discs made of carbon-carbon composite materials.

BACKGROUND

Carbon-carbon composite materials are composite materials that include a matrix including carbon reinforced with carbon fibers. Carbon-carbon (C—C) composite components can be used in many high temperature applications. For example, the aerospace industry employs C—C composite components as friction materials for commercial and military aircraft, such as brake friction materials.

Some carbon-carbon composites, such as some carbon-carbon composite brake discs that are used in the aerospace industry, may be manufactured from porous preforms that include layers of carbon fiber, which may be densified using one or more of several processes, including chemical vapor deposition/chemical vapor infiltration (CVD/CVI), vacuum/pressure infiltration (VPI), or resin transfer molding (RTM), to infiltrate the porous preform with carbon. Prior to the densification process some preforms may be subjected to a needling process.

SUMMARY

In some examples, the disclosure describes a preform for a carbon-carbon composite, the preform including a plurality of fibrous layers stacked and needled-punched together to form the preform in the shape of an annulus. The annulus including an inner radial section that defines an inner preform diameter and an outer radial section that defines an outer preform diameter. Each fibrous layer of the plurality of fibrous layers includes a respective plurality of fabric segments including at least one of carbon fibers or carbon-precursor fibers, where at least one fibrous layer of the plurality of fibrous layers includes a first fabric segment forming at least a portion the inner radial section, the first fabric segment defining a first segment bisector and a first fiber orientation angle; and a second fabric segment forming at least a portion the outer radial section, the second fabric segment defining a second segment bisector and a second fiber orientation angle. The first and second segment bisectors being radially aligned within the at least one fibrous layer and the first fiber orientation angle is different than the second fiber orientation angle.

In some examples, the disclosure describes a method including forming preform for a carbon-carbon composite, where forming the preform includes stacking and needle-punching a plurality of fabric segments to produce a plurality of fibrous layers needle-punched together to form the preform in the shape of an annulus. The annulus including an inner radial section that defines an inner preform diameter and an outer radial section that defines an outer preform diameter. Each fibrous layer of the plurality of fibrous layers includes a respective plurality of fabric segments including at least one of carbon fibers or carbon-precursor fibers, where at least one fibrous layer of the plurality of fibrous layers includes a first fabric segment forming at least a portion the inner radial section, the first fabric segment defining a first segment bisector and a first fiber orientation angle; and a second fabric segment forming at least a portion the outer radial section, the second fabric segment defining a second segment bisector and a second fiber orientation angle, where the first and second segment bisectors are radially aligned within the at least one fibrous layer, and where the first fiber orientation angle is different than the second fiber orientation angle.

The details of one or more examples of the disclosure are set forth in the accompanying drawings and the description below. Other features, objects, and advantages of the disclosure will be apparent from the description and drawings, and from the claims.

DETAILED DESCRIPTION

The present disclosure describes, in some examples, techniques for producing a carbon fiber preform used to produce a densified carbon-carbon (C—C) composite that may be used, for example, to form a disc brake. The described fibrous preforms may include a plurality of layers including at least one of carbon fibers or carbon-precursor fibers, wherein the fibrous layers are superposed (e.g., fibrous layers stacked on one another) and needle-punched together. Each fibrous layer in the superposed stack may include a plurality of fabric segments that collectively form the respective fibrous layer.

The final fiber preform may be in the shape of an annulus (e.g., disc-shaped) that defines both an inner diameter and an outer diameter. Each fibrous layer in the superposed stack may be divided into two radial sections, both an inner radial section and an outer radial section. The fabric segments forming a respective fibrous layer may include at least one fabric segment that contributes to part of the inner radial section and at least one other fabric segment that contributes to the outer radial section, both of which may define different fiber orientations angles. In some examples, the fabric segment that contributes to the inner radial section may not form part of the outer radial section and vice versa.

As described further below, the fiber orientation angle within a receptive fabric segment may be set depending on the location of the lug region within the final fiber preform (e.g., region configured to receive lug notches that interlock with the splines or beam keys of a wheel and brake assembly) and depending on the fiber orientation angles of other fabric segments within neighboring layers in order to tailor the strength properties within the final C—C composite. In some examples, the fiber orientation within a respective fabric segment may be selected to improve the friction properties, shear strength, torque strength, and combinations thereof.

Figure 1:
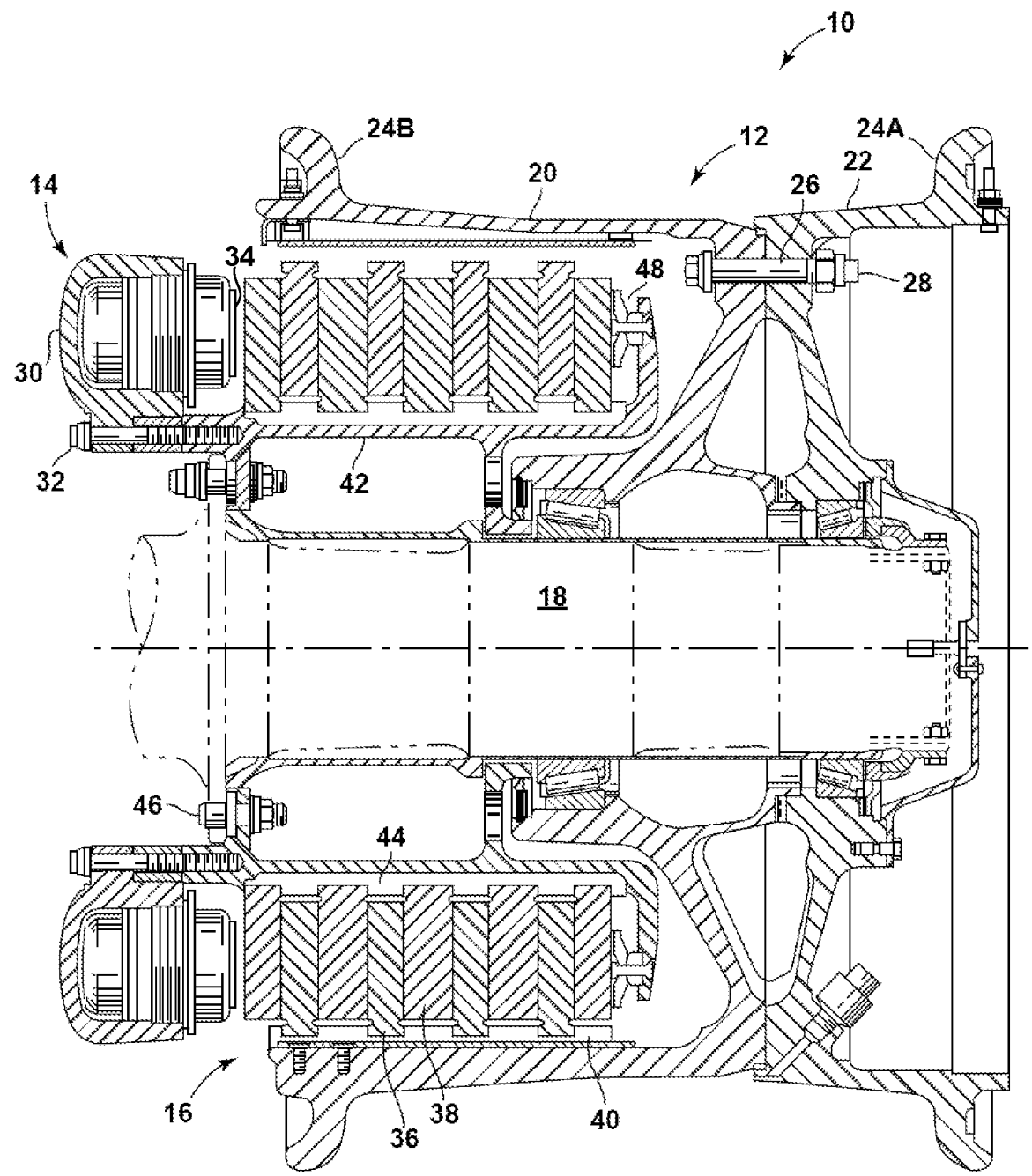
FIG. 1 is a conceptual diagram illustrating an example wheel and brake assembly that may include one or more of disc brakes formed in accordance with the techniques and structural features of this disclosure.

FIG. 1 is a conceptual diagram illustrating an example wheel and brake assembly 10 that may include one or more of disc brakes formed in accordance with the techniques and structural features of this disclosure. For ease of description, examples of the disclosure will be described primarily with regard to aircraft brake assemblies formed of C—C composite components. However, the techniques of this disclosure may be used to form C—C composite components other than aircraft brake discs. For example, the C—C composite components may be used as friction materials in other types of braking applications and vehicles.

In the example of FIG. 1, wheel and brake assembly 10 includes a wheel 12, an actuator assembly 14, a brake stack 16, and an axle 18. Wheel 12 includes wheel hub 20, wheel outrigger flange 22, bead seats 24A and 24B, lug bolt 26, and lug nut 28. Actuator assembly 14 includes actuator housing 30, actuator housing bolt 32, and ram 34. Brake stack 16 includes alternating rotor brake discs 36 and stator brake discs 38; rotor brake discs 36 are configured to move relative to stator brake discs 38. Rotor brake discs 36 are mounted to wheel 12, and in particular wheel hub 20, by beam keys 40. Stator brake discs 38 are mounted to axle 18, and in particular torque tube 42, by splines 44. Wheel and brake assembly 10 may support any variety of private, commercial, or military aircraft or other type of vehicle.

Wheel and brake assembly 10 includes wheel 12, which in the example of FIG. 1 is defined by a wheel hub 20 and a wheel outrigger flange 22. Wheel outrigger flange 22 may be mechanically affixed to wheel hub 20 by lug bolts 26 and lug nuts 28. Wheel 12 defines bead seals 24A and 24B. During assembly, an inflatable tire (not shown) may be placed over wheel hub 20 and secured on an opposite side by wheel outrigger flange 22. Thereafter, lug nuts 28 can be tightened on lug bolts 26, and the inflatable tire can be inflated with bead seals 24A and 24B providing a hermetic seal for the inflatable tire.

Wheel and brake assembly 10 may be mounted to a vehicle via torque tube 42 and axle 18. In the example of FIG. 1, torque tube 42 is affixed to axle 18 by a plurality of bolts 46. Torque tube 42 supports actuator assembly 14 and stator brake discs 38. Axle 18 may be mounted on a strut of a landing gear (not shown) or other suitable component of the vehicle to connect wheel and brake assembly 10 to the vehicle.

During operation of the vehicle, braking may be necessary from time to time, such as during landing and taxiing procedures of an aircraft. Wheel and brake assembly 10 is configured to provide a braking function to the vehicle via actuator assembly 14 and brake stack 16. Actuator assembly 14 includes actuator housing 30 and ram 34. Actuator assembly 14 may include different types of actuators such as one or more of, e.g., an electrical-mechanical actuator, a hydraulic actuator, a pneumatic actuator, or the like. During operation, ram 34 may extend away from actuator housing 30 to axially compress brake stack 16 against compression point 48 for braking.

Brake stack 16 includes alternating rotor brake discs 36 and stator brake discs 38. Rotor brake discs 36 are mounted to wheel hub 20 for common rotation by beam keys 40. Stator brake discs 38 are mounted to torque tube 42 by splines 44. In the example of FIG. 1, brake stack 16 includes four rotors and five stators. However, a different number of rotors and/or stators may be included in brake stack 16 in other examples.

Rotor brake discs 36 and stator brake discs 38 may provide opposing friction surfaces for braking an aircraft. As kinetic energy of a moving aircraft is transferred into thermal energy in brake stack 16, temperatures may rapidly increase in brake stack 16. As such, rotor brake discs 36 and stator brake discs 38 that form brake stack 16 may include robust, thermally stable materials capable of operating at very high temperatures.

In one example, rotor brake discs 36 and/or stator brake discs 38 are formed as a C—C composite in the form of an annulus that defines a set of opposing wear surfaces. The C—C composite may be fabricated using any suitable manufacturing technique or combination of techniques including, for example, vacuum pressure infiltration (VPI), resin transfer molding (RTM), chemical vapor infiltration (CVI), chemical vapor deposition (CVD), additive manufacturing, mechanical machining, ablation techniques, or the like using the fiber preforms describe herein as the starting substrate.

As briefly noted, in some examples, rotor brake discs 36 and stator brake discs 38 may be mounted in wheel and brake assembly 10 by beam keys 40 and splines 44, respectively. In some examples, beam keys 40 may be circumferentially spaced about an inner portion of wheel hub 20. Beam keys 40 may, for example, be shaped with opposing ends (e.g., opposite sides of a rectangular) and may have one end mechanically affixed to an inner portion of wheel hub 20 and an opposite end mechanically affixed to an outer portion of wheel hub 20. Beam keys 40 may be integrally formed with wheel hub 20 or may be separate from and mechanically affixed to wheel hub 20, e.g., to provide a thermal barrier between rotor brake discs 36 and wheel hub 20. Toward that end, in different examples, wheel and brake assembly 10 may include a heat shield (not shown) that extends out radially and outwardly surrounds brake stack 16, e.g., to limit thermal transfer between brake stack 16 and wheel 12.

In some examples, splines 44 may be circumferentially spaced about an outer portion of torque tube 42. As such, stator brake discs 38 may include a plurality of radially inwardly disposed lug notches along an inner diameter of the brake disc configured to engage with splines 44. Similarly, rotor brake discs 36 may include a plurality of radially inwardly disposed lug notches along an outer diameter of the brake disc configured to engage with beam keys 40. As such rotor brake discs 36 will rotate with the motion of the wheel while stator brake discs 38 remain stationary allowing the friction surfaces of an adjacent stator brake disc 38 and rotor brake disc 36 to engage with one another to decelerate the rotation of wheel 12.

Figure 2:
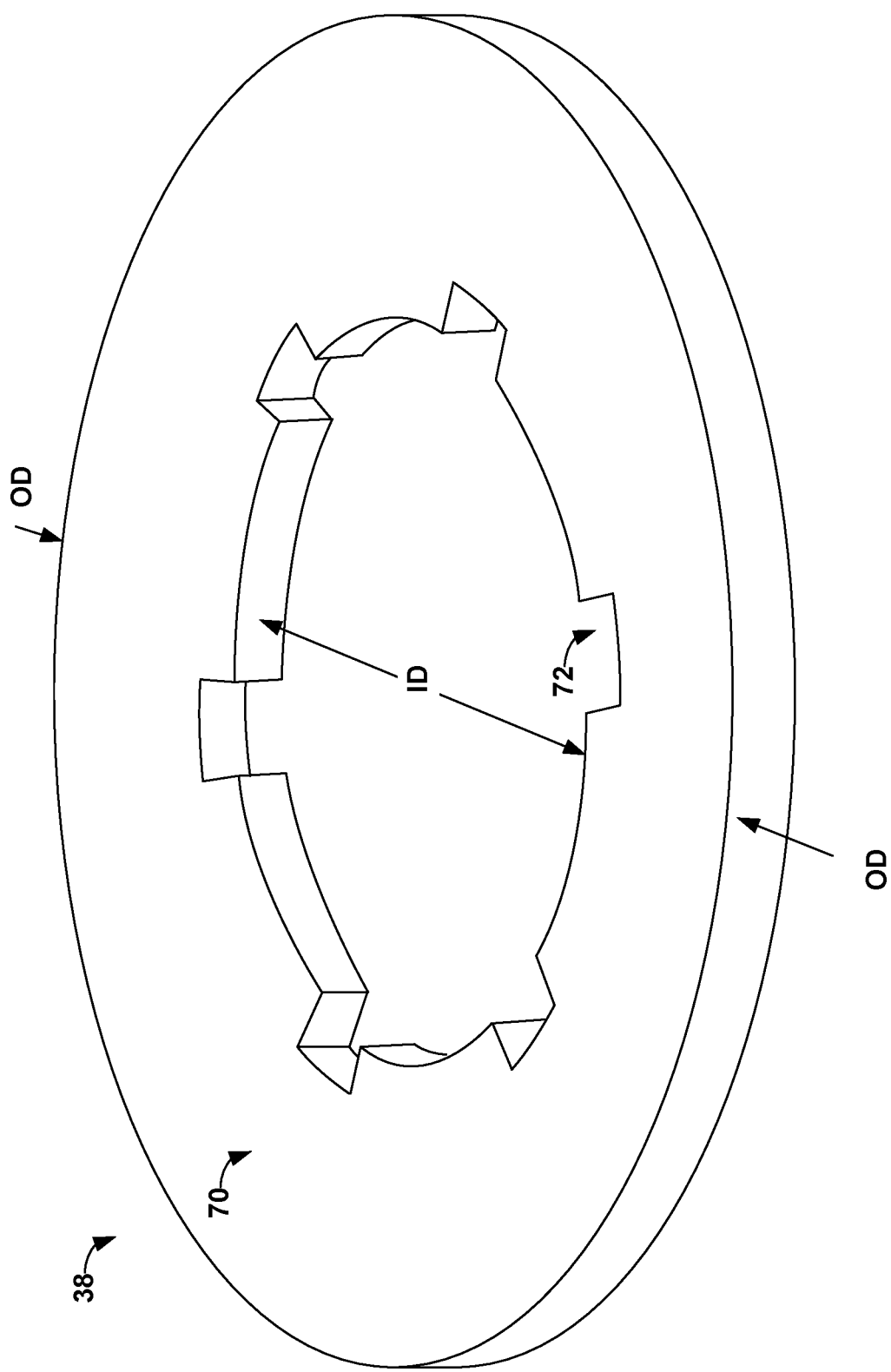
FIG. 2 is a schematic perspective view of an example stator brake disc that defines both an inner diameter (ID) and an outer diameter (OD).

FIG. 2 is a schematic perspective view of an example stator brake disc 38 that defines both an inner diameter (ID) and an outer diameter (OD). Stator brake disc 38 includes opposing friction surfaces 70 positioned on opposite sides of the annulus. Along the inner diameter, stator brake disc 38 include a plurality of lug notches 72 cut into the body 72 stator brake disc 38 along the inner perimeter configured to engage and interlink with splines 44 of wheel and brake assembly 10. For a rotor disc brake 36, lug notches 72 would occur along the outer diameter of the annulus and configured to engage and interlink with beam keys 40.

During a breaking procedure, splines 44 and beam keys 40 may engage with the respective lug notches 72 of rotor and stator brakes discs 36 and 38 transferring a large amount of torque into the brake discs. As described further below, the torque forces created during the braking procedure may be transferred into the underlying fiber architecture of the C—C composite. As described further below, if the fibers of the C—C composite are oriented in a radial arrangement, the resultant forces may be exerted in a direction generally perpendicular to the longitudinal length of the fibers. In contrast, if the fibers are oriented in a tangential arrangement (e.g., aligned perpendicular to the radius), the resultant forces may be exerted in a direction generally along the longitudinal length of the fibers. The resulting arrangements may result in either a bending or a compressive force being exerted on the underlying fibers within the C—C composite, neither of which are optimal for purposes of strengthening the resultant C—C composite disc brake.

As discussed further below, the fiber performs described herein, which may be used to form rotor and stator brake discs 36 and 38, may include fiber architectures that tailor orientation the fiber within specified regions of rotor or stator disc brakes 36 and 38. In some examples, the orientation the fibers within the regions of rotor or stator disc brakes 36 and 38 the ultimately define lug notches 72 may be to an intermediate angle that may help to improve the resultant torque and strength properties of rotor or stator disc brakes 36 and 38.

Figure 3:
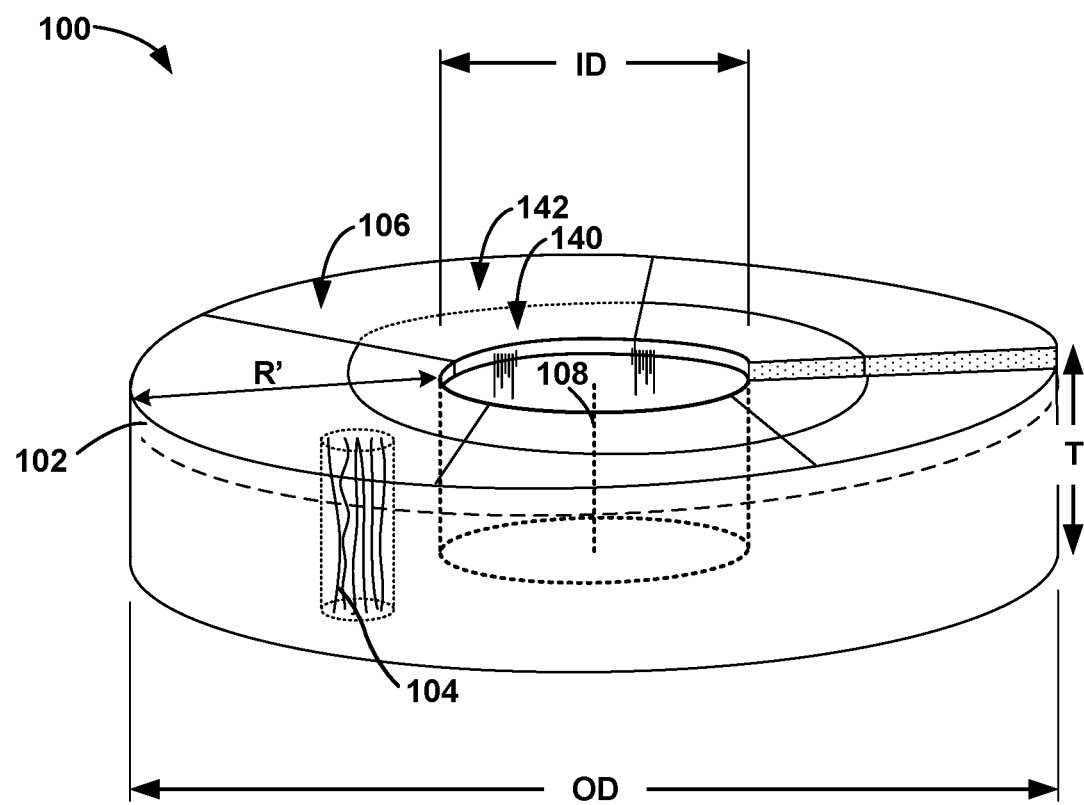
FIG. 3 is a schematic perspective view of an example fibrous preform that may be used to manufacture a densified C—C composites describe herein.

FIG. 3 is a schematic perspective view of an example fibrous preform 100 that may be used to manufacture a densified C—C composites describe herein (e.g., rotor or stator brake discs 36 and 38 of FIGS. 1 and 2). Fibrous preform 100 includes a plurality of superposed fibrous layers 102 (stacked on one another relative to the central axis of the stack) that are needle-punched together to form fibrous preform 100 in the shape of an annulus.

The needle-punch process may introduce a plurality of needled fibers 104 into fibrous preform 100 which mechanically bind fibrous layers 102 together. Needled fibers 104 may extend in a general vertical direction aligned with central axis 108 and penetrate into two or more or fibrous layers 102. In some examples, needled fibers 104 may help secure fibrous layers 102 to one another. Additionally, or alternatively, the needle-punch process and resulting needled fibers 104 may partially compress fibrous layers 102 to form a more compacted fibrous preform 100 compared to a stack including a similar number of fibrous layers 102 that have not been needle-punched together.

As described further below, each fibrous layer 102 includes a plurality of fabric segments 106 that collectively form a respective layer 102. In some examples, each fibrous layer 102 may be in the form of a planar disc or ring while in other examples each fibrous layer 102 may be non-planar. For example, fibrous preform 100 may be formed by sequentially adding abutting fabric segments 106 in the form of continuous helix about central axis 108. In such examples, each fibrous layer 102 may define a portion of the helix in terms of the number or revolutions about central axis 108. In some examples, each fibrous layer 102 may define about 0.9 to about 1.2 revolutions (e.g., about 325 degrees)(° to about) 420°. In examples where a respective fibrous layer 102 defines more than one full revolution of the helix, a portion of the respective fibrous layer 102 may overlap with itself. Despite the overlap, the respective fibrous layer 102 may still be characterized as a single fibrous layer 102 within fibrous preform 100.

While some of the figures described herein show a relatively small number of layers used form the respective fibrous preforms, the preforms (e.g., fibrous preform 100) produced as a result of the techniques describe herein may include any suitable number of fibrous layers 102 (e.g., 30 or more layers) to produce the desired thickness (T) of the resultant preform. In some examples, each fibrous layer 102 may have a thickness as measured in a direction parallel (e.g., parallel or nearly parallel) to central axis 108 of about 1 millimeter (mm) to about 2 mm and the total thickness (T) of fibrous preform 100 when complete may be about 1 inch to about 3 inches (e.g., about 2.5 cm to about 7.6 cm).

In some examples, fibrous preform 100 may be constructed with lug notches 72 (not shown in FIG. 3) formed into either the outer diameter (OD) or inner diameter (ID) depending on whether fibrous preform 100 is intended to be formed as a rotor disc brake 36 or stator disc brake 38 respectively. Lug notches 72 may be pre-fabricated into fabric segments 106 used to form fibrous preform 100, may be cut into fibrous preform 100 after the respective fibrous layers 102 and fabric segments 106 have all been stacked and needle-punched together, or may be introduced after fibrous preform 100 has undergone some or all of the subsequent carbonization and densification procedures to convert fibrous preform 100 into a C—C composite. As described further below, the intended location of lug notches 72 along the inner or outer diameter of fibrous preform 100 may determine the fiber orientation within respective fabric segments 106 depending on whether the respective fabric segments 106 contributes the inner or outer radial sections of fibrous preform 100.

Fibrous preform 100, once completed, may be in the shape of a disc or annulus defining an outer preform diameter (OD) and inner preform diameter (ID). In some examples, the outer preform diameter (OD) of fibrous preform 100 may be about 14.5 inches (e.g., about 37 cm) to about 25 inches (e.g., about 64 cm) and the inner preform diameter (ID) of fibrous preform 100 may be about 4.5 inches (e.g., about 12 cm) to about 15 inches (e.g., about 38 cm).

Figure 4:
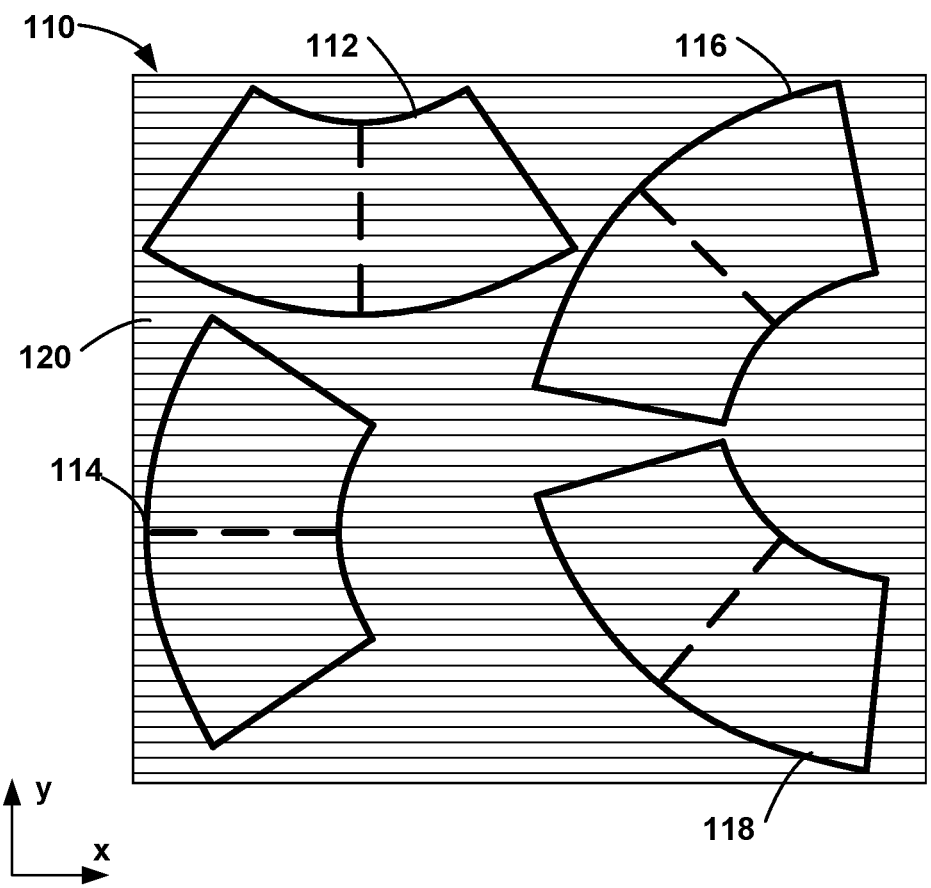
FIG. 4 is a schematic view of an example fabric that may be used to form different types of fabric segments described herein including the fabric segments of fibrous preform of FIG. 3.

FIG. 4 is a schematic view of an example fabric 110 that may be used to form different types of fabric segments described herein including fabric segments 106 of fibrous preform 100. Fabric 110 includes a plurality of unidirectionally aligned fibers 120, which are shown as being aligned in the x-axis direction of FIG. 4. Fibers 120 may include carbon fibers, fibers configured to subsequently pyrolyze into carbon fibers (hereinafter "carbon-precursor fibers"), or combinations thereof. Carbon-precursor fibers may include, for example, polyacrylonitrile (PAN) fibers, oxidized polyacrylonitrile (O-PAN) fibers, rayon fibers, or the like.

In some examples, fibers 120 may be in the form of tows (e.g., bundles of individual fibers linearly aligned) of continuous filaments. Each tow may include hundreds to several thousand of individual fibers 120 unidirectionally aligned to form a single tow. In such examples, fabric 110 may include a plurality of unidirectionally aligned tows within the segment with each tow comprising a plurality of fibers 120.

In some examples, fabric 110 may be a duplex fabric that includes a plurality of unidirectionally aligned fibers 120 (e.g., aligned tows) that have been combined with a plurality of web fibers (not shown). The web fibers may include chopped, discontinuous, or staple fibers having an unspecified alignment that are relatively short in comparison to fibers 120 that, when combined with fibers 120 in a duplex fabric, become intertwined with aligned fibers 120 to impart integrity to fabric 110. The web fibers may define a random fiber orientation relative to each other and to aligned fibers 120.

In some examples, the formation of a duplex fabric may be accomplished by combining one or more layers of aligned tow fibers (e.g., fibers 120) with one or more layers of web fibers that are subsequently needle-punched into the layer of tow fibers to form duplex fabric. For example, a layer of web fibers may be formed by crosslapping a carded web to achieve a desired areal weight and then needle-punching the layer to form the web layer. Additionally, or alternatively, the web layer may be formed by airlaying the web fibers on top of a layer of the unidirectionally aligned fibers 120. The layer of unidirectionally aligned fibers 120 may be formed by spreading large continuous tows using a creel, to form a sheet of the desired areal weight with fiber 120 being aligned in the same direction. Both the web layer and the layer of unidirectionally aligned fibers 120 may be needle-punched together to force the relatively short web fibers to become intertwined with unidirectionally aligned fibers 120 to form the duplex fabric (e.g., fabric 110).

Additionally, or alternatively fabric 110 may be formed as a duplex fabric by initially incorporating web fibers within the tows of unidirectionally aligned fibers 120. A layer of the described tows may be formed by spreading large the tows using a creel, to form a sheet of the desired areal weight. The layer may then be needle-punched to force the relatively short web fibers to become intertwined with unidirectionally aligned fibers 120 thereby forming the duplex fabric.

As a result of needling process in either of the above examples, the web fibers become intertwined with the aligned fibers 120 and help bind aligned fibers 120 together allowing fabric 110 to be efficiently handled without having aligned fibers 120 separate or fall apart with subsequent processing. The resultant duplex fabric (e.g., fabric 110) may be more durable, retain its shape better, and be overall easier to further manufacture compared to a layer of only unidirectionally aligned fibers 120. Other techniques may also be used to form fabric 110 as a duplex fabric that includes both unidirectionally aligned fibers 120 and web fibers which may be known to those skilled in the art. In all the examples described herein, fabric 110 and the fabric segments used to from the fibrous preforms described herein may be composed of one or more layers of a duplex fabric.

In some examples, in addition to holding fabric 110 together, the web fibers used to produce the duplex fabric may ultimately be used to form or contribute to a portion of needled fibers 104 in fibrous preform 100 as a result of fibrous layers 102 being superposed (e.g., stacked on each other) and needle-punched together. Additionally, or alternatively, at least some of unidirectionally aligned fibers 120 may be transformed into needled fibers 104 within fibrous preform 100 as a result of fibrous layers 102 being superposed and needle-punched together. For example, the needle-punch process may break some of the unidirectionally aligned fibers 120 contained in fabric 110 and at least partially transfer the broken fibers into one or more adjacent fibrous layers 102 within fibrous preform 100 to form needled fibers 104.

Both the web fibers and unidirectionally aligned fibers 120 may be formed of the same carbon fiber or carbon fiber precursor materials, may be formed of different carbon fiber or carbon fiber precursor materials, or may be formed of different combinations of carbon fiber and/or carbon fiber precursor materials. In some examples, fabric 110 may be formed to have an areal fiber weight of the combined web and unidirectionally aligned fibers 120 of about 1250 grams per square meter ($g/m^2$) to about 3000 $g/m^2$ such as, about 1350 $g/m^2$ to about 2000 $g/m^2$.

Figure 5:
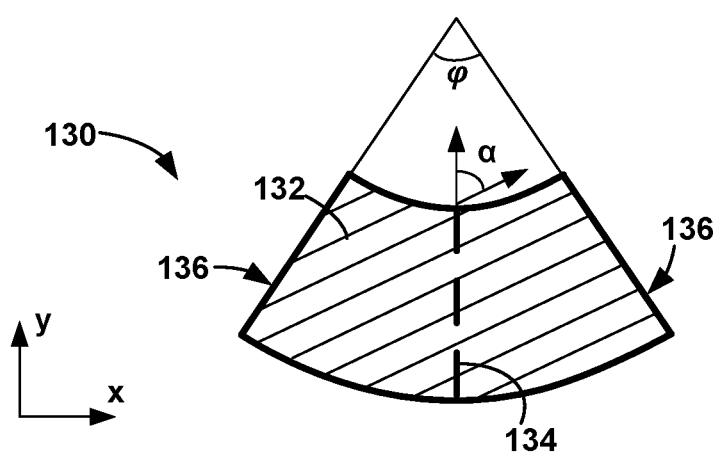
FIG. 5 is a schematic aerial view of an example fabric segment.

FIG. 4 illustrates a total of four fabric segments 112-118 being cut from fabric 110 with different types of fiber orientations. Each fabric segment 112-118 may be characterized in terms of its arc angle ($\varphi$) and its fiber orientation angle ($\alpha$), the concepts of which are illustrated in FIG. 5 which is a schematic aerial view of an example fabric segment 130. Fabric segment 130 includes unidirectionally aligned fibers 132 may define a segment bisector 134 which represent the center or bisecting line of the arcuate shape of fabric segment 130. The fiber orientation angle ($\alpha$) represents the angle between segment bisector 134 and the direction in which unidirectionally aligned fibers 132 are aligned. The arc angle ($\varphi$) represents the angle between abutting edges 136 of a respective fabric segment 132 and indicates the degree of rotation that a respective fabric segment 132 will occupy within a fibrous layer 102. For example, an arc angle ($\varphi$) equal to 360° represents one full revolution about central axis 108 while an arc angle ($\varphi$) equal to 45° represents $\frac{1}{8}^{th}$ of a full revolution about central axis 108.

The fiber orientation angle ($\alpha$) of the fabric segments described herein may be between 0° and ±90° (e.g., anywhere from negative (−90°) to positive)(+90°). For example, referring back to FIG. 4, fabric segment 112 may be characterized as having a fiber orientation angle ($\alpha$) of 90° because the segment bisector of fabric segment 112 is substantially perpendicular (e.g., perpendicular or nearly perpendicular) to the direction of unidirectionally aligned fibers 120. In some such examples, fabric segment 112 may be referred as having a "tangentially aligned" or "chordal aligned" fiber orientation. Fabric segment 114 may be characterized as having a fiber orientation angle ($\alpha$) of 0° because the segment bisector of fabric segment 114 is substantially parallel (e.g., parallel or nearly parallel) to the direction of unidirectionally aligned fibers 120. In some such examples, fabric segment 114 may be referred as having a "radially aligned" fiber orientation. Fabric segments 116 and 118 may be characterized as having a fiber orientation angle ($\alpha$) of either about +45° or about −45° because the segment bisector of fabric segments 116 and 118 are offset from the unidirectionally aligned fibers 120 by about 45°.

Each fabric segment 112-118 may be obtained from fabric 110 using any suitable technique. In some examples, fabric segment 112-118 may be die cut from fabric 110 with the fiber orientation angle ($\alpha$) being obtained by adjusting the angle of the die cut relative to the orientation of unidirectionally aligned fibers 120. As will be appreciate by one skilled in the art, fabric segments 116 and 118 may be constructed using the same die cut orientation with the respective fiber orientation angles ($\alpha$) of either +45° or −45° being obtained by simply flipping a respective fabric segment over (e.g., flipping fabric segment 116 over will produce fabric segment 118). Such understanding likewise holds true for intermediate fiber orientation angles ($\alpha$)

between 0° and 90°. For example, a fabric segment may be formed with a fiber orientation angle (α) of 80°. If desired, to obtain a fabric segment having a −80° fiber orientation angle (α), the respective fabric segment may be simply turned over.

In some examples, the fabric segments described herein may define an arc angle (φ) such that, fabric segments forming a single fibrous layer 102 of fibrous preform 100 complete a single full revolution. For example, if a total of six arcuate fabric segments 132 are used to define one complete fibrous layer 102, each fabric segment 132 may define an arc angle (φ) of 60° so that the six fabric segments 132 when aligned with abutting edges 136 (e.g., the edges defining arc angle (φ)) in contact with the abutting edges of adjacent fabric segments 132 will complete one full revolution with each fabric segment occupying ⅙$^{th}$ of the respective fibrous layer 102.

In some examples, the fabric segments described herein may define arc angles (φ) that do not add up to 360° (i.e., one complete revolution) within a fibrous layer 102. For example, fabric segments 106 may be sized so that the plurality of fabric segments 106 within a respective fibrous layer 102 complete more or less than one full rotation within the layer. In some examples, each fabric segment 106 may define arc angle (φ) of about 65° to about 70° (e.g., about 68°), however, other arc angles (φ) may be used if desired.

In some examples where the respective fabric segments (e.g., fabric segments 106) forming fibrous preform 100 each define an arc angle (φ) of about 65° to about 70°, the respective fibrous layer 102 may complete about 1.08 to about 1.17 revolutions per fibrous layer 102. For example, fabric segments 106 may be sequentially added in a continuing helix pattern. If all the respective fabric segments 106 define an arc angle (φ) of about 68°, the respective fibrous layer 102 may complete about 1.13 revolutions with a small portion of the layer (e.g., about 13%) overlapping itself.

As described further below, setting the arc angle (φ) to about 65° to about 70° (e.g., about 68°) may help to minimize the butt joint overlap of abutting edges 136 between adjacent fibrous layers 102 within the final constructed fibrous preform 100. Additionally, or alternatively, having the arc angle (φ) of about 65° to about 70° (e.g., about 68°) for fabric segments 106 may help to create more uniform alignment of fibers 120 within fibrous preform 100 compared to larger arc angles (φ).

Figure 6A:
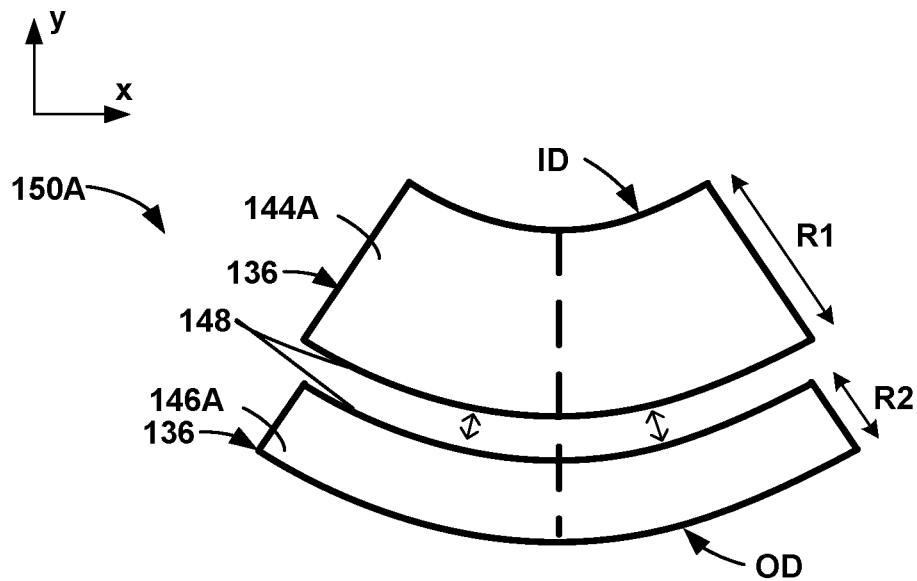
FIGS. 6A and 6B are schematic exploded views of two different sets of fabric segments that may be used to form part of the fibrous layers of FIG. 3.
Figure 6B:
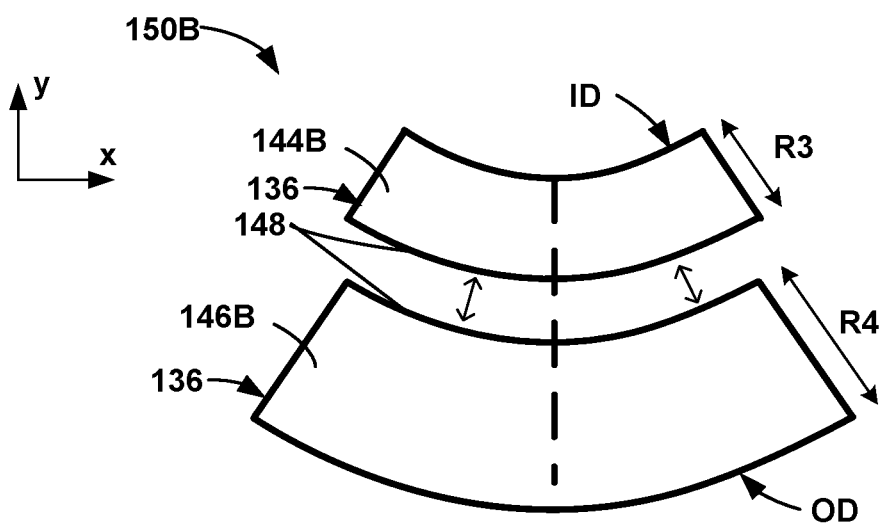

For reasons described further below, each fibrous layer 102 may be separated into an inner radial section 140 and an outer radial section 142 with each respective section being formed by a different set of fabric segments 106. FIGS. 6A and 6B are schematic views of two different sets 150 of fabric segments 144 and 146 that may be used to form part of fibrous layers 102. FIG. 6A shows the set 150A of fabric segments 144A and 146A that may be used to form parts of inner radial section 140 and outer radial section 142 respectively of a respective fibrous layer 102 and FIG. 6A shows the set 150B of fabric segments 144B and 146B that that may be used to form parts of inner radial section 140 and outer radial section 142 respectively.

Within each set 150 of fabric segments 144 and 146, the two respective fabric segments 144 and 146 may be sized and shaped so that when aligned within fibrous preform 100, neighboring edges 148 of set 150 are configured to abut one another. Additionally, each fabric segment 144 and 146 within a respective set 150 may define substantially the same (e.g., the same within the tolerances of manufacturing techniques) arc angels (a) so that abutting edges 136 align substantially flush (e.g., flush or nearly flush) when the segment bisectors of fabric segments 144 and 146 are radially aligned and added to fibrous preform 100.

As illustrated in FIGS. 6A and 6B, the differences between set 150A of fabric segments 144A and 146A and set 150B of fabric segments 144B and 146B is the respective radial lengths (R1-R4) of each fabric segment. Each set 150 is illustrated as an exploded view with neighboring edges 148 being separated which will abut one another in the final stack. In set 150A of fabric segments 144A and 146A, fabric segment 144A, which may be used to form part of inner radial section 140 of fibrous layer 102, defines a larger radial length (R1) compared to the radial length (R2) of fabric segment 146A, which may be used to form part of outer radial section 142. In contrast, fabric segment 144B, which may be used to form part of inner radial section 140 of fibrous layer 102, defines a smaller radial length (R3) compared to the radial length (R4) of fabric segment 146B which may be used to form part of outer radial section 142. The combined radial lengths of a respective set 150 of fabric segments 144 and 146 may define the radial length of fibrous preform 100 (e.g., R1+R2=R' or R3+R4=R').

In some examples, the radial lengths of fabric segments 144 and 146 within a respective set 150 may be substantially the same (e.g., R1=R2 or R3=R4) while in other examples, the radial lengths within a respective set 150 of fabric segments 144 and 146 may be differently sized depending on whether fibrous preform 100 is being designed to function as a rotor or stator disc brake 36 and 38. For example, as discussed above, stator disc brakes 36 may include a plurality of lug notches 72 cut into the inner diameter (ID) of the annulus while rotor disc brakes 38 may include a plurality of lug notches 72 cut into the outer diameter (OD) of the annulus. The respective region of fibrous preform 100 intended to receive lug notches 72 may be configured with the fabric segment having the smaller radial length (e.g., R2 or R3). For example, set 150A of fabric segments 144A and 146A may be used to form a rotor disc brake 36 where lug notches 72 will be formed along the outer diameter (ID) and cut into fabric segment 146A. Set 150B of fabric segments 144B and 146B may be used to form a stator disc brake 36 where lug notches 72 will be formed along the inner diameter (ID) and cut into fabric segments 144B. By constructing fibrous preform 100 in this manner, the fiber orientation within the fabric segments intended to receive lug notches (e.g., fabric segments 146A and 144B) may be optimized for torque strength while the fabric segments forming the majority of the radial length of fibrous preform 100 (e.g., fabric segments 144A and 146B) may be optimized for friction.

In some examples, a respective set 150 of fabric segments 144 and 146 may be sized so that the fabric segment having the smaller radial length (e.g., fabric segments 146A or 144B) is sized so that the radial length (e.g., R2 or R3) amounts to less than half the total radial length (R') of fibrous preform 100. In some examples, the fabric segment having the smaller radial length may be sized so that the comparative ratio of the radial lengths for a respective set 150 of fabric segments 144 and 146 may about 0.3 to about 0.8 (e.g., R2:R1 and R3:R4 may each be within the range of about 0.3 to about 0.8). Additionally, or alternatively, the fabric segments having the smaller radial lengths (e.g., R2 or R3) may amount to approximately ⅓ the total radial length (R') of fibrous preform 100 (e.g., about R'/3 with variation to allow for avoidance of butt joint overlap associated with neighboring edges 148 as described further below).

Figure 7A:
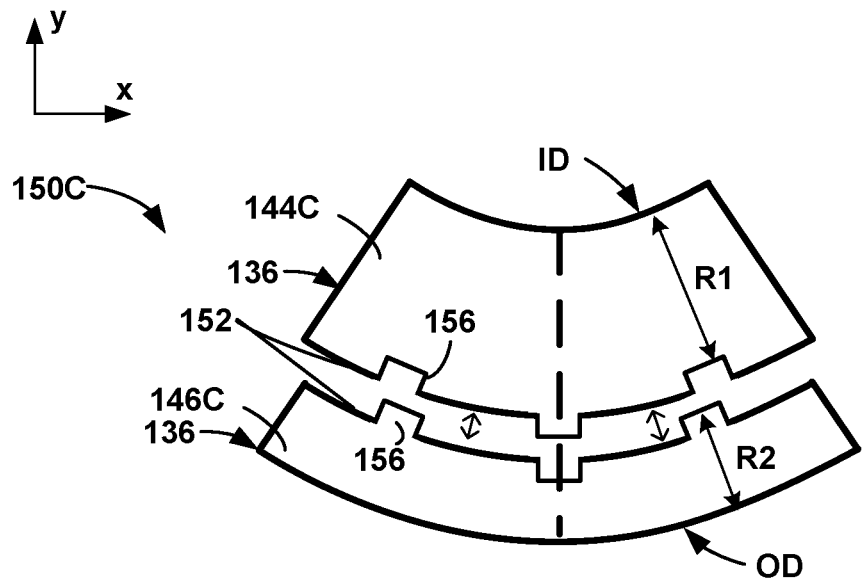
FIGS. 7A and 7B are schematic exploded views of two additional sets of fabric segments that may be used to form part of the fibrous layers of FIG. 3.
Figure 7B:
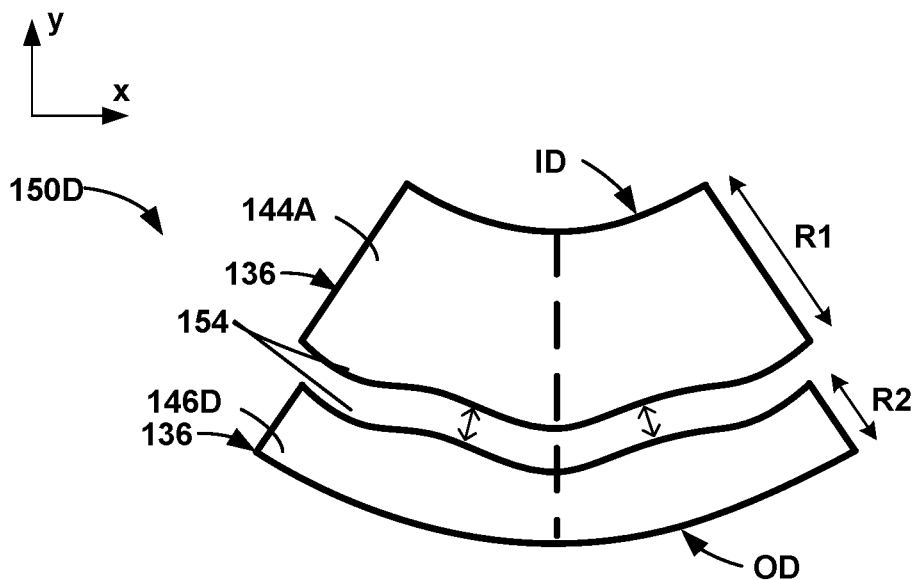

In some examples, neighboring edges 148 may be in the form circular arc as shown in FIGS. 6A and 6B (e.g., an arc with constant radius relative to central axis 108. In other examples, neighboring edges 148 may define a non-circular arc, one or more geometric interlocking structures, or both. FIGS. 7A and 7B are schematic view additional example sets of fabric segments (e.g., set 150C of fabric segments 144C and 146C and set 150D or fabric segments 144D and 146D) that may be used to form part of fibrous layers 102. Each set 150 is illustrated as an exploded view with neighboring edges 152 and 154 being separated which will abut one another in the final stack. FIG. 7A shows the set 150C of fabric segments 144C and 146C that may be used to form parts of inner radial section 140 and outer radial section 142 respectively of a respective fibrous layer 102 and includes one or more geometric interlocking structures 156 included along neighboring edges 152 that are configured to geometrically align and pair with one another. For example, neighboring edge 152 of fabric segment 146C may include one or more geometric protrusions that mate with corresponding recesses along neighboring edge 152 of fabric segment 144C and vice versa. In some examples, the geometric interlocking structures 156 may be cog-shaped that define rectangular, triangular, or other suitable shapes. In such examples, the radial lengths R1 and R2 may refer to the minimum and maximum radial lengths of fabric segments 144C and 146C respectively or vise versa.

FIG. 7B shows the set 150D of fabric segments 144D and 146D that may be used to form parts of inner radial section 140 and outer radial section 142 respectively of a respective fibrous layer 102 and includes neighboring edges 154 that define non-circular arcs configured to geometrically pair with one another. In some examples, the neighboring edges 154 may define an undulated, linear, combination thereof, or other non-circular edge (e.g., non-circular relative to a radial arc from central axis 118). In such examples, the radial lengths R1 and R2 may refer to the minimum and maximum radial lengths of fabric segments 144C and 146C respectively or vise versa.

Figure 8A:
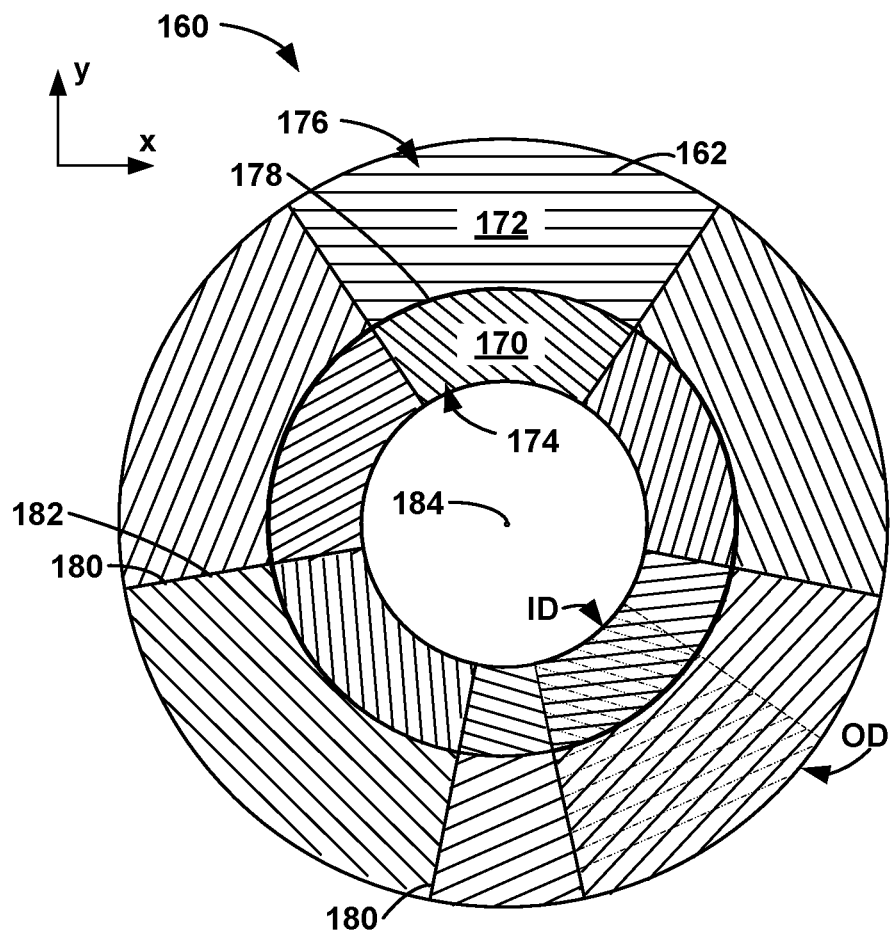
FIGS. 8A and 8B are a set of schematic aerial (FIG. 8A) and side (FIG. 8B) views of an example fibrous preform that may be used to manufacture a densified carbon-carbon composite disc brake.
Figure 8B:
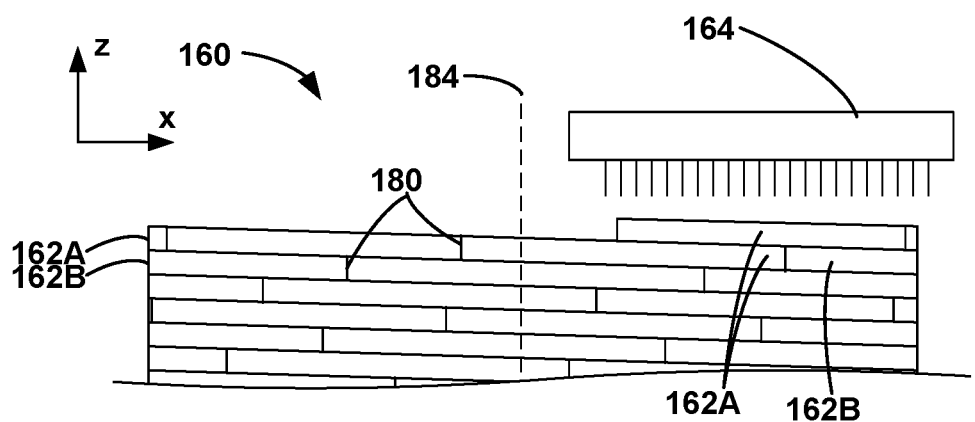

In some examples, the orientation of unidirectionally aligned fibers 120 of fabric segments 144 and 146 within a respective set 150 may be comparatively different to one another. FIGS. 8A and 8B are a set schematic aerial (FIG. 8A) and side (FIG. 8B) views of an example fibrous preform 160 that may be used to manufacture a densified carbon-carbon composite disc brake (e.g., stator or rotor disc brakes 36 and 38). Fibrous preform 160 includes a plurality of superposed fibrous layers 162 that are stacked and needle-punched together using a needling device 164 to produce a plurality of needled fibers (not shown) that extend into more than one fibrous layer 162. Each fibrous layer 162 may be formed by a plurality of fabric segments 170 and 172 that are helically aligned and superposed over previously formed fibrous layers 162 (e.g., fibrous layer 162A is positioned on fibrous layer 162B).

Within each fibrous layer 162, the plurality of fabric segments 170 and 172 includes at least one fabric segment 170 that forms part of an inner radial section 174 of fibrous preform 160 and at least one fabric segment 172 that forms that forms part of an outer radial section 176 of fibrous preform 160. In some examples, fabric segment 170 contributing to inner radial section 174 and fabric segment 172 contributing to outer radial section 174 may abut one another along neighboring edges 178 and define the total radial length of fibrous preform 160. In some examples, neighboring edges 178 may include one or more geometric interlocking structures or define non-circular edges as described above with respect to FIGS. 7A and 7B, which may improve the shear or torque strength of fibrous preform 160.

Each fabric segment of the plurality of fabric segments 170 and 172 forming a respective fibrous layer 162A may define a respective arc angle ($\alpha$) and fiber orientation angle ($\varphi$). The arc angles ($\alpha$), fiber orientation angles ($\varphi$) as well as the underlying fabric 110 used to form fabric segments segment 170 and 172 may be substantially the same as those described above with respect to FIGS. 3-6B apart from any differences noted below. Additionally, fibrous preform 160 maybe substantially the same as fibrous preform 100 apart from any differences noted below.

In some examples, the respective one or more fabric segments 170 that form part of inner radial section 174 of fibrous preform 160 may include a different fiber orientation angles ($\varphi$) than the one or more fabric segments 172 that form part of outer radial section 176. For example, in examples where a respective radial section (e.g., inner radial section 174) is intended to receive lug notches 72, the respective one or more fabric segments (e.g., fabric segment 170) contributing to that radial section may define a fiber orientation angle ($\varphi$) of about +10° to about +80° or about −10° to about −80° (collectively referred to as "±10-80°"); may define a fiber orientation angle ($\varphi$) of about +30° to about +60° or about −30° to about −60°; may define a fiber orientation angle ($\varphi$) about +40° to about +50° or about −40° to about −50°; or set the fiber orientation angle ($\varphi$) of about −45° or +45°.

In some examples, by having the fiber orientation angle ($\varphi$) of the fabric segments 170 or 174 that contributes to the lug region be about ±10-80° (e.g., ±45°), unidirectionally aligned fibers 120 within the respective fabric segment 170 or 174 may exhibit improved torque strength compared to a fabric segment where unidirectionally aligned fibers 120 within the fabric segment are tangentially or radially aligned (e.g., fabric segments 112 and 114). Additionally, in examples where a given radial section (e.g., outer radial section 176) is not intended to receive lug notches 72, the respective one or more fabric segments (e.g., fabric segment 172) contributing to that radial section may define a fiber orientation angle ($\varphi$) of about 0° or about 90°, such that unidirectionally aligned fibers 120 within the respective one or more fabric segments (e.g., fabric segment 172) are either radially or tangentially aligned. In some examples, while radially or tangentially aligned fibers may be less optimal for distributing torque loads generated within the lug regions, the radially or tangentially aligned fibers may have improved frictional and heat dissipation properties compared to other fiber orientation angles ($\varphi$).

For example, if fibrous preform 160 is being used to construct stator disc brake 38, within a respective fibrous layer 162A, all fabric segments 170 forming inner radial section 174 may each define the same fiber orientation angle ($\varphi$) which may be about ±10-80° (e.g., ±45°) and all fabric segments 172 forming outer radial section 176 may each define the fiber orientation angle ($\varphi$) of about 0° or about 90°. The resultant fibrous layer 162A may be configured to receive lug notches within inner radial section 174. In some such examples, the radial length of fabric segments 170 forming inner radial section 174 may be less than the radial length of fabric segments 172 forming outer radial section 176 as discussed above with respect to FIGS. 6A and 6B.

If fibrous preform 160 is being used to construct rotor disc brake 36, within a respective fibrous layer 162A, all fabric segments 172 forming outer radial section 176 may each define the fiber orientation angle ($\varphi$) which may be about ±10-80° (e.g., ±45°) and all fabric segments 170 forming inner radial section 174 may each define the same fiber orientation angle (φ) of about 0° or about 90°. The resultant fibrous layer 162A may be configured to receive lug notches within outer radial section 176. In some such examples, the radial length of fabric segments 172 forming outer radial section 176 may be less than the radial length of fabric segments 170 forming inner radial section 174 as discussed above with respect to FIGS. 6A and 6B.

Each of plurality of fabric segments 170 and 172 may define any suitable arc angle (α). In some examples, each respective fabric segment 170 and 174 may define the same arc angle (α) set at about 65° to about 70° (e.g., about 68°). In some such examples, each fibrous layer 162 may include a total of twelve fabric segments 170 and 172, e.g., six fabric segments 170 contributing to inner radial section 174 and six fabric segments 172 contributing to outer radial section 176. Each respective set 150 of one inner and one outer fabric segments (e.g., fabric segments 170 and 172 identified in FIG. 8A) may be positioned and sized such that their respective neighboring edges 178 abut one another and their respective segment bisectors radially align. By setting the arc angles (α) to a value of about 65° to about 70°, the associated butt joints 180 between abutting edges 182 of sequentially laid fabric segments 170 or 172 may be dispersed so that respective butt joints 180 do not axially align between neighboring fibrous layers 162A and 162B, thereby improving the strength of fibrous preform 160. The non-axial alignment of butt joints 180 can be seen in FIG. 8B. It will be understood that in the example described, each fibrous layer 162 completes more than one revolution relative to the central axis 184 of fibrous preform 160 within the helix.

Figure 9A:
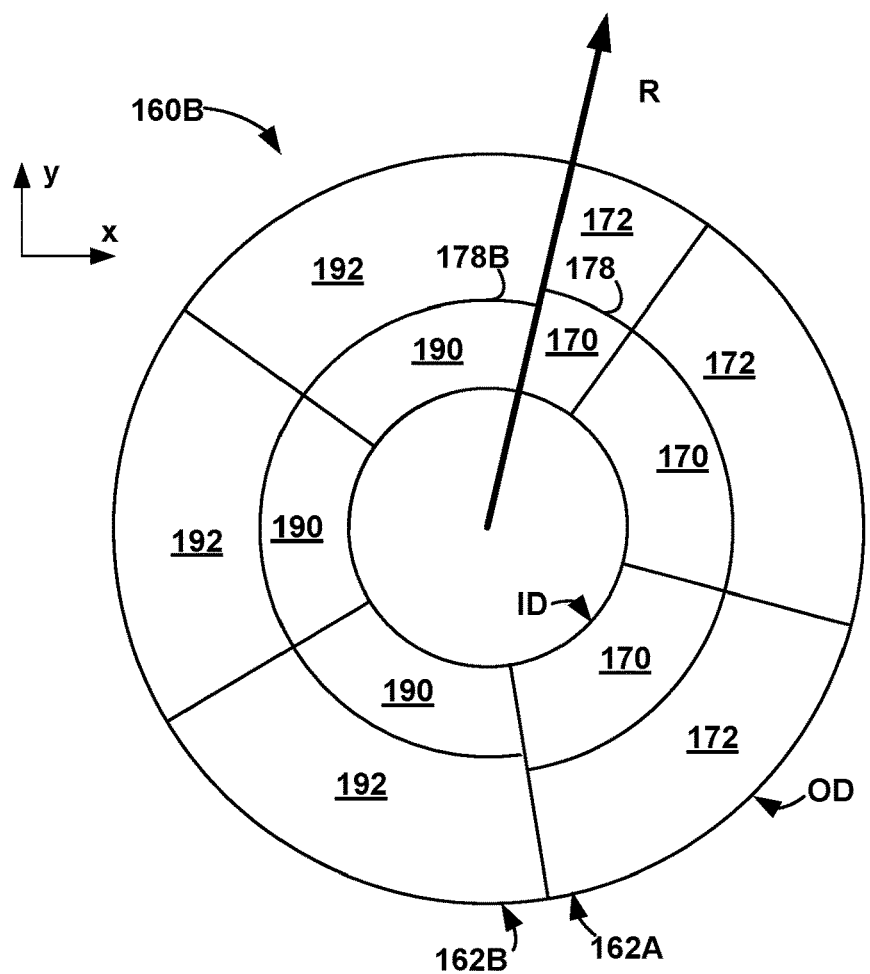
FIGS. 9A and 9B are a set of schematic aerial (FIG. 9A) and cross-sectional (FIG. 9B) views of a fibrous preform, which includes the fibrous preform of FIG. 8A plus the addition of half of a fibrous layer added to the upper surface of the fibrous preform.
Figure 9B:
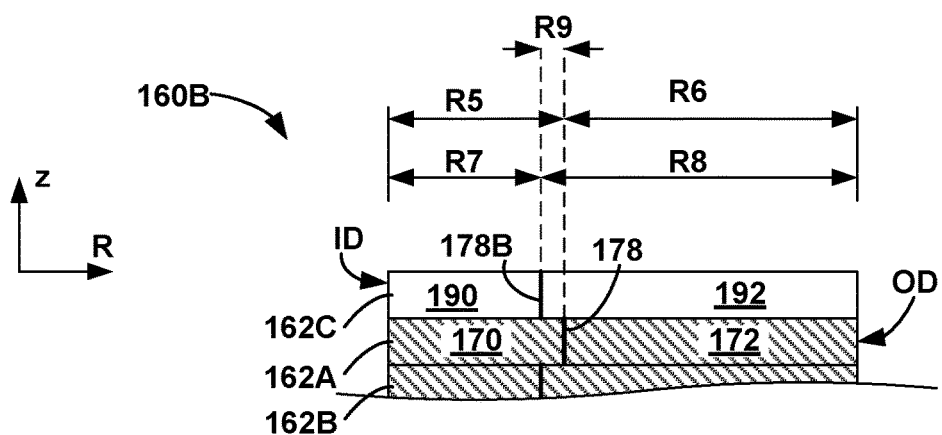

In some examples, directly adjacent fibrous layers 162 within fibrous preform 160 may include fabric segments 170 and 172 that define different fiber orientation angles (φ) relative to the different fibrous layers 162. For example, FIGS. 9A and 9B are a set of schematic aerial (FIG. 9A) and cross-sectional (FIG. 9B) views of a fibrous preform 160B, which includes fibrous preform 160 shown in FIG. 8A plus the addition of half of a fibrous layer 162C added to the upper surface of fibrous preform 160. The half fibrous layer 162C includes plurality of fabric segments 190 and 192. Only half of the additional fibrous layer 162C (e.g., three fabric segments 190 and three fabric segments 192) is shown in FIG. 9A for illustrative purposes to show some of the concepts described below and the remainder of the additional fibrous layer 162C may be added to complete the layer. Fabric segments 190 and 192 may FIG. 9B is a cross-sectional side view of fibrous preform 160B parallel to central axis 184 (e.g., z-axis) taken along radial line R (coordinates of FIG. 9B are shown in the z-R plane).

In some examples, directly adjacent fibrous layers 162A and 168B may be configured to exhibit fiber orientation angles (φ) that are offset by about 90° relative to each other. For example, if a respective fabric segment (e.g., fabric segment 170) of a respective radial section (e.g., inner radial section 174) defines a first fiber orientation angle (φ) (e.g., set to about +45°), the fabric segments (e.g., fabric segment 190) forming a similar inner or outer radial section in the next directly adjacent fibrous layer 162C may be configured to have a second fiber orientation angle (φ) of about 90° opposite the first fiber orientation angle (e.g., set to about)–45°. In some examples, by having the fiber orientation angles (φ) between directly adjacent fibrous layers 162A and 167C be offset from one another by about 90° relative to each other may help to improve the overall strength of the resultant C—C composite.

As one non-limiting example of a construction for a stator disc brake 38, a first fibrous layer 162A may include an inner radial section 174 composed of one or more fabric segments 170 that define a first fiber orientation angle (φ) of about +10° to about +80° (e.g., +45°) and an outer radial section 176 composed of one or more fabric segments 172 that define a second fiber orientation angle (φ) of about 90° (e.g., tangentially aligned). Fibrous preform 160B may include a second directly adjacent fibrous layer 162C that includes an inner radial section 174 composed of one or more fabric segments 190 that define a third fiber orientation angle (φ) of about −10° to about −80° (e.g., −45°) and an outer radial section 176 composed of one or more fabric segments 192 that define a fourth fiber orientation angle (φ) of about 0° (e.g., radially aligned). In some such examples, the first and third fiber orientation angles and the second and fourth fiber orientation angles (φ) may be about 90° offset respectively.

In some examples, to reduce the presence of butt joint overlap along neighboring edges 178 and 178B of fabric segments 170, 172, 190, 192 between adjacent fibrous layers 162A and 162C within fibrous preform 160B, the radial lengths of fabric segments 170/190 and 172/192 may be different within adjacent fibrous layers 162A and 162C, the edges may include one or more geometric interlocking structures 156 that are radially and/or axially offset from one another within adjacent fibrous layers 162A and 162C, define non-circular edges that are offset from one another (e.g., do not axially align) within adjacent fibrous layers 162A and 162C, or combinations thereof, which may improve the shear or torque strength of fibrous preform 160B. For example, as shown in FIGS. 9A and 9B, a respective set of fabric segments 190 and 192 within fibrous layer 162C may define neighboring edges 178B which are radially offset from the neighboring edges 178 of a respective set of fabric segments 170 and 172 within the directly underlying fibrous layer 162A. Fabric segments 170, 172, 190, and 192 may each define radial lengths R5, R6, R7, and R8 respectively. The respective radial lengths of fabric segments 170 and 190 forming portions of inner radial sections 174 of respective adjacent fibrous layers 162A and 162C (e.g., radial lengths R5 and R7) may be comparatively different so that neighboring edges 178 and 178B do not radially overlap along central axis 184. Likewise, the respective radial lengths of fabric segments 172 and 192 (e.g., radial lengths R6 and R8) may be comparatively different. Reducing the presence of butt joint overlap between neighboring edges 178 and 178B within adjacent layers may help improve the strength and cohesiveness of resultant fibrous preform 160B.

Additionally, or alternatively, fabric segments 170, 172, 190, and 192 may each define one or more or more geometric interlocking structures 156 along neighboring edges 178 and 178B. The geometric interlocking structures 156 within each fibrous layer 162A and 162C may be offset such that the respective protrusions and recesses within adjacent fibrous layers 162A and 162C do not axially align.

As described with respect to FIGS. 6A and 6B, the radial lengths of a respective set of fabric segments 170/172 or 190/192 may be selected depending on whether lug notches 72 are intended to be formed along the inner or outer diameter of fibrous preform 160B. For example, in examples where preform 160B is intended to form a stator brake disc 38, the radial lengths of fabric segments 170 and 190 contributing to the inner radial section 174 within respective fibrous layer 162 may be smaller than the radial lengths of fabric segments 172 and 192 contributing to the outer radial section 176 within the respective fibrous layer 162 (e.g., R5<R6 and R7<R8). In some such examples, the comparative ratio of the radial lengths for a respective set of fabric segments 170/172 or 190/192 may be set at about 0.3 to about 0.8 (e.g., R5:R6 and R7:R8 are each within the range of about 0.3 to about 0.8) with the comparative ratios for the different layers 162A and 162C being different to account for the butt joint overlap between neighboring edges 178 and 178B (e.g., R5:R6≠R7:R8).

In some examples where preform 160B is intended to form a rotor brake disc 36, the relative lengths may be reversed such that R5>R6 and R7>R8 with the ratio R6:R5 and R8:R7 each within the range of about 0.3 to about 0.8. Again, the comparative ratios for the different layers 162A and 162C may be different to account for the butt joint overlap between neighboring edges 178 and 178B (e.g., R6:R5≠R8:R7).

The radial overlap (e.g., R9) of neighboring edges 178 and 178B between adjacent fibrous layers 162A and 162C may be relatively small. In some examples, the radial overlap (R9) may be less than about 20 millimeters (mm) such as less than about 5 (mm), however other lengths may also be used.

The radial lengths of a respective set of fabric segments 170/172 or 190/192 may collectively total the radial length of the fibrous preform 160B to within manufacturing tolerances (e.g., R5+R7=R6+R8=R').

Once fibrous preform 160B has been fully formed to a desired thickness (T), the preform may be subjected to one or more pyrolyzation and densification cycles. For example, fibrous preform 160B may be initially pyrolyzed (e.g., carbonized) to convert any carbon-precursor materials into carbon. Fibrous preform 160B may then be subjected to one or more densification cycles such as chemical vapor deposition/chemical vapor infiltration (CVD/CVI), vacuum/pressure infiltration (VPI), or resin transfer molding (RTM), followed by subsequent pyrolyzation or heat treatment cycles to infiltrate the porous preform with carbon matrix material.

Figure 10:
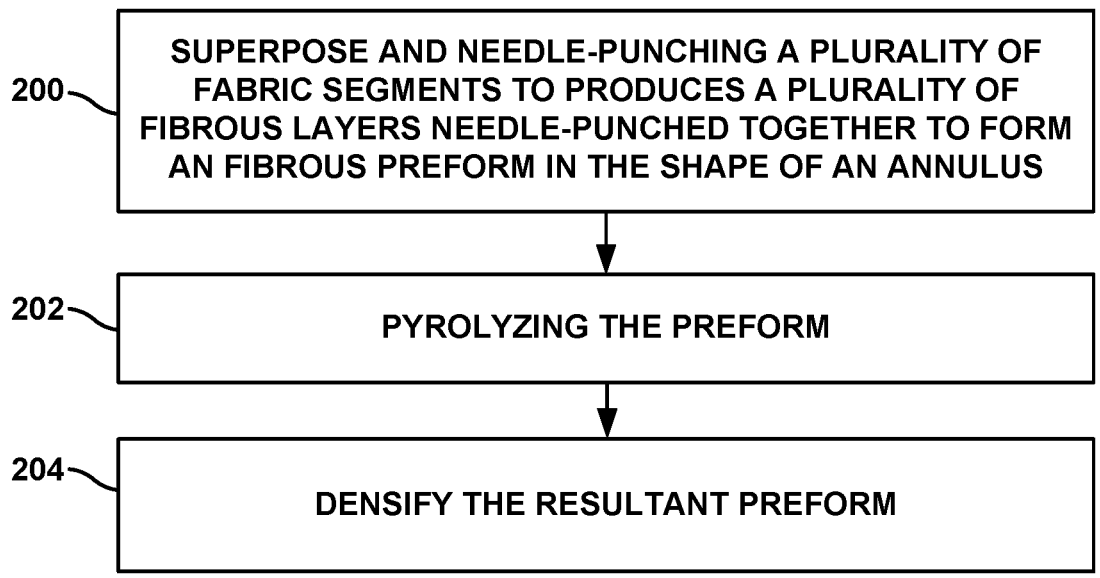
FIG. 10 is a flow diagram illustrating an example technique of manufacturing a fibrous preform.

The fibrous preforms described herein may be formed using any suitable technique. FIG. 10 is a flow diagram illustrating an example technique of manufacturing a fibrous preform. For ease of illustration, the example method of FIG. 10 is described primarily with respect to fibrous preform 160B; however, other fibrous preforms may be formed using the described techniques and fibrous preforms 160 and 160B of FIGS. 7A-8B may be made using other techniques.

The example technique of FIG. 10 includes superposing (e.g., helically stacking) and needle-punching a plurality of fabric segments 170, 172, 190, 192 to produce a plurality of fibrous layers 162 needle-punched together to form fibrous preform 160B in the shape of an annulus (200); pyrolyzing fibrous preform 160B (202); and densifying the resultant preform 160B (204).

As described above, each fibrous layer 162 may include a respective plurality of fabric segments 170/172, 190/192, which may be sequentially added in by stacking the plurality of fabric segments to form a helix. In some example, each fibrous layer 162 may complete about 0.9 to about 1.2 revolutions of the helix such that butt joints 180 between abutting edges 178 and 178B do not radially overlap between adjacent fibrous layers 162A and 162C.

Within preform 160B, each respective fibrous layer 162A may be divided into an inner and an outer radial section 174 and 176. The respective plurality of fabric segments 170/172 forming the respective fibrous layer 162A may be cut and shaped such that at least one of the fabric segments 170 contributes to part of the inner radial section 174 and at least one of the fabric segments 172 contributes to part of the outer radial section 176. A respective set 150 of fabric segments 170 and 172 may each define the same arc angle (α) and be positioned with their respective segment bisectors 134 being radially aligned. As described above, fabric segments 170 and 172 within a respective set may define different fiber orientation angles (φ) and a radial length (R5 and R6) which are both comparatively different and may depend on whether preform 160B is intended to form a rotor or stator brake disc 36 or 38. Additionally, or alternatively, the radial lengths for fabric segments 170, 172, 190, 192 within adjacent fibrous layers 162A and 162B (R5-R8) may be comparatively different so as to avoid the presence of butt joint overlap between neighboring edges 178 and 178B.

Each fabric segment or set of fabric segments may be needle-punched after being added to fibrous preform 160B. In some examples, the fabric segments may be needled into preform 160B on a layer-by-layer basis. Additionally, or alternatively, more than one fibrous layers 162 maybe be added to preform 160B and then the collective superposed layers 162 may be needle-punched. The entire process may then continue until the desired preform thickness (T) is obtained.

Once fibrous preform 160B has been formed, fibrous preform 160B may be pyrolyzed (202) to convert any carbon-precursor material into carbon through a thermal degradation process to effectively burn off any non-carbon material. For example, fibrous preform 160B may be carbonized by heating fibrous preform 160B in a retort under inert or reducing conditions to remove the non-carbon constituents (hydrogen, nitrogen, oxygen, etc.) from fibers 120 and/or needled fibers 104. The carbonization can be carried out using retort, such as an autoclave, a furnace, a hot isostatic press, a uniaxial hot press, or the like. In each of these techniques, fibrous preform 160B may be heated in the inert atmosphere at a temperature in the range of about 600° C. to about 1000° C. while optionally being mechanically compressed. The mechanical compression may be used to define the geometry (e.g., thickness (T)) of fibrous preform 160B. In some examples, the retort may be purged gently with nitrogen for approximately 1 hour, then slowly heated to about 900° C. over the course of approximately 10-20 hours, followed by elevating the temperature to about 1050° C. over approximately 1-2 hours. The retort then may be held at about 1050° C. for approximately 3-6 hours before the carbonized preform is allowed to cool overnight. In some examples, the carbonization step can be carried out at even higher temperature, including up to about 1800° C. or up to about 2600° C.

After carbonization, fibrous preform 160B may be subjected to one or more densification cycles to form a C—C composite (204). Example densification cycles may include, for example, being densified by applying one or more cycles of CVI/CVD of a carbonaceous gas. Any suitable carbonaceous gas may be used during the CVI/CVD processing including, for example, carbon-based gases such as natural gas, methane, ethane, propane, butane, propylene, or acetylene, or a combination of at least two of these gases. In some examples, the application of the carbonaceous gas to densify a fibrous preform 160B via CVI/CVD may occur substantially in a vacuum space (e.g., a vessel with an internal environment at less than 100 Torr) or under an inert gas environment so as to control the chemical deposition reaction. In some examples, during application of the CVI/CVD gas, the environment including fibrous preform 160B may be heated to an elevated temperature, for example about 900° C. to about 1200° C., to promote the chemical deposition reaction.

In other examples, fibrous preform 160B may be densified (204) using other suitable techniques including for example, resin infiltration and carbonization via resin transfer mold (RTM) processing, vacuum pressure infiltration (VPI) processing, high pressure infiltration (HPI), or the like. In some examples, the densification step (204) may produce a densified C—C composite substrate having a final density of about 1.65 to about 1.95 g/cc.

In some examples, during or after the densification of fibrous preform 160B, the major friction surfaces of the resultant C—C composite may be sculpted into a desired shape, such as a final brake disc shape. For example, C—C composite substrate may be ground in the shape of a densified C—C composite disc brake having a final thickness T (e.g., about 1.4 inches). Additionally, or alternatively, lug notches 72 may be formed at this time.

Various examples have been described. These and other examples are within the scope of the following claims.

What is claimed is:

1. A preform for a carbon-carbon composite, the preform comprising:
   a plurality of fibrous layers stacked and needled-punched together to form the preform in the shape of an annulus, the annulus comprising:
   an inner radial section that defines an inner preform diameter; and
   an outer radial section that defines an outer preform diameter;
   wherein each fibrous layer of the plurality of fibrous layers comprises a respective plurality of fabric segments, the respective plurality of fabric segments comprising at least one of carbon fibers or carbon-precursor fibers, wherein at least one fibrous layer of the plurality of fibrous layers comprises:
      a first fabric segment forming at least a portion of the inner radial section, the first fabric segment defining a first segment bisector and a first fiber orientation angle; and
      a second fabric segment forming at least a portion of the outer radial section, the second fabric segment defining a second segment bisector and a second fiber orientation angle, wherein the first and second segment bisectors are radially aligned within the at least one fibrous layer, and wherein the first fiber orientation angle is different than the second fiber orientation angle.

2. The preform of claim 1, wherein either the first fiber orientation or the second fiber orientation angle is about negative (−) 10 degrees to about −80 degrees or about positive (+) 10 degrees to about +80 degrees.

3. The preform of claim 2, wherein either the first fiber orientation or the second fiber orientation angle is about +45 degrees or about −45 degrees.

4. The preform of claim 2, wherein either the second fiber orientation angle or the first fiber orientation angle is about 0 degrees or about 90 degrees.

5. The preform of claim 1, wherein the first fabric segment and the second fabric segment each define an arc angle of about 65 degrees to about 70 degrees.

6. The preform of claim 1, wherein the plurality of fibrous layers are stacked and needled-punched together in a helix, wherein each fibrous layer of the plurality of fibrous layers completes about 0.9 to about 1.2 revolutions of the helix.

7. The preform of claim 1, wherein the first fabric segment defines a first radial length and the second fabric segment defines a second radial length, wherein a ratio of the first radial length to the second radial length is about 0.3 to about 0.8.

8. The preform of claim 1, wherein the first fabric segment defines a first neighboring edge and the second fabric segment defines a second neighboring edge that abuts the first neighboring edge, wherein the first neighboring edge and the second neighboring edge have complementing geometric interlocking structures.

9. The preform of claim 1, wherein the at least one fibrous layer comprises a first fibrous layer, the plurality of fibrous layers further comprising a second fibrous layer comprising:
   a third fabric segment forming at least a portion of the inner radial section, the third fabric segment defining a third segment bisector and a third fiber orientation angle; and
   a fourth fabric segment forming at least a portion of the outer radial section, the fourth fabric segment defining a fourth segment bisector and a fourth fiber orientation angle, wherein the third and fourth segment bisectors are radially aligned within the second fibrous layer, and wherein the third fiber orientation angle is different than the fourth fiber orientation angle.

10. The preform of claim 9, wherein the third fiber orientation angle is different than the first fiber orientation angle.

11. The preform of claim 10, wherein the third fiber orientation angle is offset by about 90 degrees to the first fiber orientation angle.

12. The preform of claim 9, wherein the first fabric segment defines a first radial length, the second fabric segment defines a second radial length, the third fabric segment defines a third radial length, and the fourth fabric segment defines a fourth radial length, wherein a ratio of the first radial length to the second radial length is different than a ratio of the third radial length to the fourth radial length.

13. The preform of claim 12, wherein an absolute difference between the first radial length and the third radial length is greater than zero and less than about 20 millimeters (mm).

14. The preform of claim 9, wherein the first fibrous layer defines a first plurality of butt joints between adjacent fabric segments of the plurality of fabric segments, the second fibrous layer defines a second plurality of butt joints between adjacent fabric segments of the plurality of fabric segments, and wherein the first and second fibrous layers are stacked such that the first plurality of butt joints and the second plurality of butt joints do not radially overlap.

15. The preform of claim 1, wherein each fabric segment of the plurality of fabric segments comprise a duplex fabric comprising unidirectionally aligned fiber and web fibers.

16. A method comprising:
   forming preform for a carbon-carbon composite, wherein forming the preform comprises:
      stacking and needle-punching a plurality of fabric segments to produce a plurality of fibrous layers needle-punched together to form the preform in the shape of an annulus, the annulus comprising:
      an inner radial section that defines an inner preform diameter; and
      an outer radial section that defines an outer preform diameter;

wherein each fibrous layer of the plurality of fibrous layers comprises a respective plurality of fabric segments comprising at least one of carbon fibers or carbon-precursor fibers, wherein at least one fibrous layer of the plurality of fibrous layers comprises:
  a first fabric segment forming at least a portion of the inner radial section, the first fabric segment defining a first segment bisector and a first fiber orientation angle; and
  a second fabric segment forming at least a portion of the outer radial section, the second fabric segment defining a second segment bisector and a second fiber orientation angle, wherein the first and second segment bisectors are radially aligned within the at least one fibrous layer, and wherein the first fiber orientation angle is different than the second fiber orientation angle.

17. The method of claim 16, wherein either the first fiber orientation angle is about negative (−) 10 degrees to about −80 degrees or about positive (+) 10 degrees to about +80 degrees and the second fiber orientation angle is about 0 degrees or about 90 degrees.

18. The method of claim 16, wherein stacking and needle-punching the plurality of fabric segments comprises stacking the plurality of fabric segments to form a helix, wherein each fibrous layer of the plurality of fibrous layers completes about 0.9 to about 1.2 revolutions of the helix.

19. The method of claim 16, wherein stacking and needle-punching a plurality of fabric segments comprises:
  forming a first fibrous layer comprises comprising the first fabric segment and the second fabric segment; and
  forming a second fibrous layer on the first fibrous layer, wherein the second fibrous layer comprises:
    a third fabric segment forming at least a portion of the inner radial section, the third fabric segment defining a third segment bisector and a third fiber orientation angle; and
    a fourth fabric segment forming at least a portion of the outer radial section, the fourth fabric segment defining a fourth segment bisector and a fourth fiber orientation angle, wherein the third and fourth segment bisectors are radially aligned within the second fibrous layer, wherein the third fiber orientation angle is different than the fourth fiber orientation angle, wherein the third fiber orientation angle is different than the first fiber orientation angle, and
  wherein the first fabric segment defines a first radial length and the third fabric segment defines a third radial length, the first radial length being less than the third radial length.

20. The method of claim 16, further comprising:
pyrolyzing the preform; and
densifying the carbonized preform to form a densified carbon-carbon composite material.

* * * * *